US005809214A

United States Patent [19]

Nureki et al.

[11] Patent Number: 5,809,214

[45] Date of Patent: Sep. 15, 1998

[54] THERMAL PRINTER

[75] Inventors: Shinji Nureki; Shigeo Izumi, both of Chiba, Japan

[73] Assignee: Seiko Instruments Inc., Japan

[21] Appl. No.: 751,119

[22] Filed: Nov. 15, 1996

[51] Int. Cl.[6] .......... G06K 15/00

[52] U.S. Cl. .......... 395/108; 395/101

[58] Field of Search .......... 395/101, 525, 395/104, 108, 115–116; 345/525; 347/180, 181, 182, 190, 195, 196

[56] References Cited

U.S. PATENT DOCUMENTS

| | | | |
|---|---|---|---|
| 4,649,401 | 3/1987 | Kojima et al. | 346/76 |
| 5,051,756 | 9/1991 | Nomura et al. | 346/76 |
| 5,191,357 | 3/1993 | Ono | 346/76 |
| 5,483,273 | 1/1996 | Fujimoto et al. | 347/195 |
| 5,508,728 | 4/1996 | Ishijima et al. | 347/211 |

FOREIGN PATENT DOCUMENTS

| | | |
|---|---|---|
| 0473191 | 3/1992 | European Pat. Off. . |
| 0501707 | 9/1992 | European Pat. Off. . |
| 0537680 | 4/1993 | European Pat. Off. . |

*Primary Examiner*—Athur G. Evans
*Attorney, Agent, or Firm*—Adams & Wilks

[57] ABSTRACT

Dynamic division drive of a thermal printer is simplified to reduce the number of signal lines, and history control drive is made efficient to shorten time necessary for data transfer. The thermal size printer comprises a plurality of heating arrays for printing split up into blocks and arranged in a line, a plurality of driver units for driving a block of the heating arrays separately from other blocks, and a logic circuit for controlling the driver units. The logic circuit comprises a block specifying means for specifying one driver unit or two or more driver units to be operated according to block selection data BDAT inputted from the external. Only the specified driver units are all at once operated according to a single strobe signal DST inputted from the external. Further, the logic circuit comprises a data operation means for internally originating history data based on print data HDAT inputted from the external. Further, the logic circuit comprises a transfer control means for transferring the history data and the print data HDAT efficiently to each of the driver units to carry out history control drive of each of the heating arrays.

17 Claims, 4 Drawing Sheets

THERMAL PRINTER

BACKGROUND OF THE INVENTION

The present invention relates to a small size serial printer with a thermal head mounted thereon. More particularly, the present invention relates to control technology of a driver circuit for driving a heating array arranged in a line. The small size thermal printer is applicable to, for example, an output terminal of a POS cash register or a printing mechanism of a facsimile machine.

Structure of a conventional thermal printer is described briefly in the following with reference to FIG. 4. As shown in the figure, the theramal printer comprises a heating array 101 for printing arranged in a line. The heating array 101 is split up into a plurality of blocks. Driver units 102 are provided so as to correspond to the respective blocks. Each of the driver units 102 comprises, for example, a one-chip driver IC. Each of the driver units 102 comprises input terminals SI, CK, DST, LSTX, and DSTX, and an output terminal SO. Print data HDAT is inputted from the external to the input terminal SI. The print data HDAT specifies dots to be energized among dots included in the heating array 101. A clock signal HCLK is inputted from the external to the input terminal CK. The driver unit 102 stores sequentially the serial print data HDAT in a shift register therein synchronously with the clock signal HCLK. A strobe signal DST is inputted from the external to the input terminal DST. The driver unit 102 drives the heating array 101 according to the strobe signal DST and based on the print data HDAT. A latch signal LATCH is inputted to the input terminal LSTX. The driver unit 102 transfers the print data HDAT from the shift register therein to a latch register therein in response to the latch signal LATCH. The driver unit 102 drives the heating array 101 based on the print data HDAT latched in the latch register. The input terminal DSTX is grounded. The output terminal SO outputs the inputted serial print data. HDAT to the input terminal SI of the driver unit at the subsequent stage.

As described in the above, according to the conventional small size serial printer having the heating array, the heating array 101 forming a thermal head is split up into a plurality of blocks, and a plurality of driver units (driver ICs) 102 corresponding to the respective blocks are mounted. In such structure, what is called "dynamic division drive" is adopted. One, or two or more of the driver units 102 is/are selected and the corresponding block or blocks of the heating array 101 is/are driven in one printing operation. By splitting up the heating array 101 into blocks and driving the blocks individually rather than driving all the heating array 101 at a time, the amount of the carried current in one printing operation is limited. This makes it possible to hold down the capacity of a built-in power source of the thermal printer. The number and combination of the driver units 102 selected in one printing operation depend on the content of the print data HDAT. By strobe signals DST1 to DST6 supplied from the side of an external printer control circuit, the driver units 102 are selectively driven. For example, as shown in FIG. 4, when the strobe signal DST1 is inputted, a first and a second driver units 102 are operated. When the strobe signal DST2 is inputted, a third and a fourth driver units 102 are selectively operated. The rest of the driver units 102 are operated in the same way, and, when the strobe signal DST 6 is inputted, a last and a second last driver units 102 are selectively operated. In the conventional thermal printer, a single strobe signal is adapted to make two of the driver units 102 selectively operated. Generally, the strobe signals for the driver units 102 are put together inside the thermal head. This makes the printer to accept strobe signals the number of which equals to or is smaller than the number of the built-in driver ICs. In other words, sharing the strobe signals among the plurality of driver units 102 inside reduces the number of ports leading to the external printer control circuit. However, in order to conduct more efficient dynamic division drive, the operation of each of the driver units 102 must be controlled, and the number of signal lines for inputting the strobe signal in the thermal head has to be increased. Thus, there are problems that the number of terminals (the number of poles) of a coupling cable and a connector of the printer increases and that the number of output signal lines of the circuit increases.

In the conventional thermal printer, in addition to the above-mentioned dynamic division drive, in order to improve the print quality, what is called "history control drive" is adopted. According to this, first, history data is supplied to each of the driver units 102 to preliminarily energize dots included in the heating array 101, and then, the print data is supplied to regularly energize the dots. The history data is data designating dots which was not energized last time and which is to be energized this time. By first preliminarily energize such dots and then regularly energize dots based on the print data for this time, unevenness of printing throughout the dots are held down. In other words, since the temperature of the dots which was not energized last time and which is to be energized this time is lower than that of dots which was energized last time and which is to be energized this time also, the dots which was not energized last time and which is to be energized this time are preliminarily energized for compensating for the difference in temperature. This history control drive is conducted by, first transferring the history data to the latch registers for preliminary energizing and then transferring the print data to the latch registers for regularly energizing. However, according to the conventional thermal printer, the latch signal LATCH for controlling data transfer between the shift registers and the latch registers is shared by all the driver units 102. In other words, the thermal head has only one latch signal LATCH. Therefore, when the above-mentioned dynamic division drive and history control drive are combined, data transfer has to be done every time the print operation is conducted with respect to each of the driver units 102, and thus, there is a problem that the driving of the thermal head is burdened much. That is, the history data and the print data for one line have to be inputted to each of the driver units every time the print operation is conducted by the times corresponding to the number of blocks into which the one line is split up. In addition, according to the conventional printer, separately from the print data, the external printer control circuit originates the history data to be supplied to the side of the printer. Therefore, the burden on the side of the printer control circuit increases, the time necessary for data processing is prolonged, and as a result, there is a problem that the printing speed is made slow.

SUMMARY OF THE INVENTION

The present invention is made to solve the above-mentioned problems of the conventional technology, and an object of the present invention is to reduce as many as possible the number of input signal lines to be connected with a thermal head in attaining dynamic division drive. Another object of the present invention is to facilitate history control drive in combination with dynamic division drive. Still another object of the present invention is to provide a thermal printer which is controllable with a constant number of signal lines independently of the size of its thermal head (the number of dots included).

In order to attain the above objects, the following measures are taken. A small size thermal printer of the present invention comprises a plurality of heating arrays for printing split up into blocks and arranged in a line, a plurality of driver units for driving a block of the heating arrays separately from other blocks, and a logic circuit for controlling the driver units. The logic circuit, which is a characteristic element of the present invention, comprises a block specifying means for specifying one driver unit or two or more driver units to be operated according to block selection data inputted from the external. Therefore, only the specified driver units are all at once operated according to a single strobe signal inputted from the external to drive the corresponding blocks of the heating arrays. This makes it possible to conduct dynamic division drive with a single strobe signal. Preferably, each of the driver units comprises a shift register and a latch register for storing print data designating dots to be energized during a current print operation and history data designating dots which was not energized last during the print and which is to be energized during the current operation of the corresponding heating array. In this case, the logic circuit comprises a transfer control means for storing the history data for a time in shift registers of all the driver units, transferring collectively the history data as it is to the latch registers, storing the print data in the shift registers of all the driver units, and, with respect to the specified driver units only, transferring selectively the print data from the shift registers to the latch registers. According to this, the specified driver units first preliminarily energize dots of the corresponding heating arrays based on the history data latched at the latch registers, and then regularly energize dots of the corresponding heating arrays based on the print data selectively transferred to the latch registers. Further, the logic circuit preferably comprises a data operation means for logically processing the print data for the last print operation remaining in the shift registers of the driver units and the print data for the current print operation inputted from the external to internally originate the history data.

According to another aspect of the present invention, a small size thermal printer comprises a heating array, dots capable of being selectively energized being arranged therein, a driver circuit for driving the heating array based on print data designating dots to be energized, and a logic circuit for logically processing the print data for the last print operation previously inputted from the external and the print data for the current print operation next inputted from the external to internally originate history data designating dots which were not energized last time and which are to be energized this time. In other words, the small size thermal printer according to the present invention internally originates the history data without being supplied with the history data by an external host computer. In this case, the driver circuit first preliminarily energizes dots specified based on the history data originated internally, and then regularly energizes dots specified based on the print data for this time inputted from the external. Therefore, according to the thermal printer, history control operation of a thermal head can be conducted only if the print data is supplied. Preferably, the heating array is devided into a plurality of blocks and the driver circuit is devided into a plurality of driver units corresponding to the respective blocks. Further, the logic circuit comprises a block specifying means for specifying one driver unit or two or more driver units to be operated according to block selection data inputted from the external. Therefore, only the specified units are all at once operated according to a single strobe signal inputted from the external to drive the corresponding blocks of the heating array. Still further, preferably, each of the driver units comprises a latch register and a shift register for sequentially storing the history data and the print data for this time. On the other hand, the logic circuit comprises a transfer control means for storing the history data for a time in the shift registers of all the driver units, transferring collectively the history data as it is to the latch registers, storing the print data in the shift registers of all the driver units, and, with respect to the specified driver units only, transferring selectively the print data from the shift registers to the latch registers. Therefore, the specified driver units can first preliminarily energize dots based on the history data latched at the latch registers, and then regularly energize dots based on the print data selectively transferred to the latch registers.

DETAILED DESCRIPTION OF THE PREFERRED EMBODIMENT

A most preferred embodiment of the present invention is now described in detail in the following with reference to the drawings.

Figure 1:
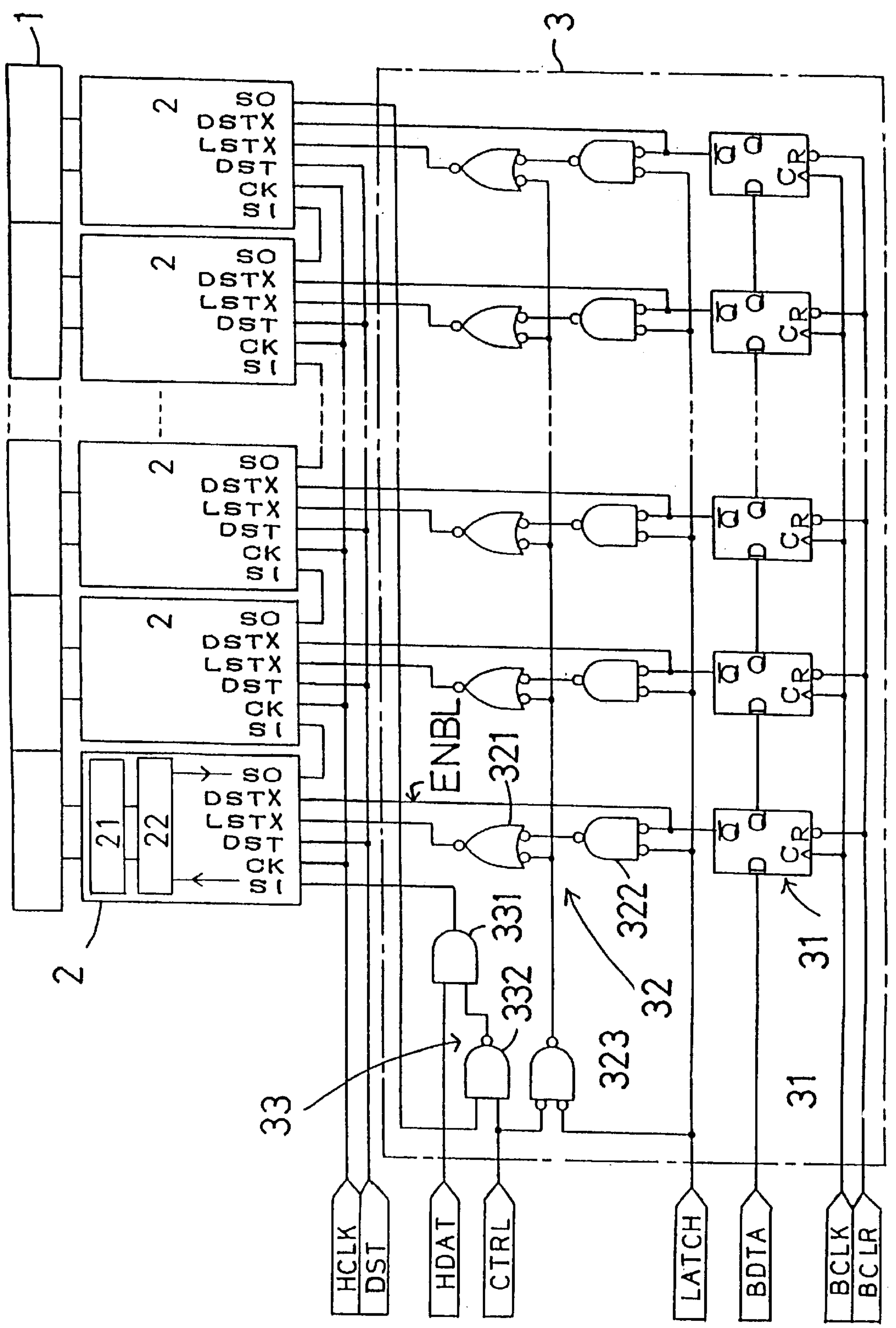
FIG. 1 is a block diagram showing electrical structure of a thermal printer according to the present invention.

FIG. 1 is a schematic block diagram showing a structure of a circuit of a small size thermal printer according to the present invention. As shown in the figure, the thermal printer comprises a heating array 1 forming a thermal head. The heating array 1 is split up into blocks and is arranged in a line. Each of the split heating array 1 comprises a plurality of dots capable of being selectively energized. For example, the thermal head comprises a heating array 1 split up into 13 blocks and each of the split heating array 1 includes 64 dots. In this case, the thermal head can print 64×13=832 dots in one line. However, it is to be noted that the present invention is in no way limited to this particular example and is generally applicable independently of the number of the blocks and the number of the dots.

The small size thermal printer has a built-in driver circuit for driving the heating array 1. The driver circuit comprises a plurality of driver units 2 provided so as to correspond to the blocks of the heating array 1. Each of the driver units 2 comprises, for example, a one-chip driver IC and drives the corresponding block of the heating array 1 separately from other blocks. The driver unit 2 comprises a latch register 21 and a shift register 22. The driver unit 2 comprises five input terminals SI, CK, DST, LSTX, and DSTX, and one output terminal SO. Print data HDAT from the external and history data internally originated are supplied to the input terminal SI. A clock signal HCLK is inputted from the external to the input terminal CK. The driver unit 2 stores serial print data HDAT and the history data in the shift register 22 synchronously with a clock signal HCLK. A single strobe signal DST is inputted from the external to the input terminal DST. A latch signal LATCH which is active at LOW level is inputted to the input terminal LSTX. The driver unit 2 transfers (latches) the data from the shift register 22 to the latch register 21 according to the latch signal LATCH. An enable signal ENBL is inputted to the input terminal DSTX. The driver unit 2 is in an enable state when the enable signal ENBL which is active at LOW level is inputted. In other words, the enable signal ENBL is a selection signal for specifying the driver units 2 to be operated. Finally, the output terminal SO serially transfers the data shifted after being inputted from the input terminal SI to an input terminal SI of a driver unit 2 at the subsequent stage.

As a characteristic matter of the present invention, the small size printer has a built-in logic circuit 3. The logic circuit 3 can be formed of, for example, a gate array as a one-chip IC. The logic circuit 3 comprises a block specifying means 31. In the present embodiment, the block specifying means 31 comprises D-type flip-flops provided so as to correspond to the respective blocks of the heating array 1. The block specifying means 31 specifies one driver unit or two or more driver units 2 to be operated according to block selection data BDAT inputted from the external. To be concrete, the flip-flops serially connected to each other operate according to a clock signal BCLK inputted from the external to sequentially latch the serial block selection data BDAT formed of bits the number of which is in accordance with the number of the blocks. Based on the latched bits, each of the flip-flops supplies to the corresponding driver unit 2 the enable signal ENBL specifying selection or non-selection thereof. It is to be noted that a clear signal BCLR is inputted from the external to a reset terminal R of each of the flip-flips. For example, at a rising-time of the power source, in order to initialize the block specifying means 31, all the flip-flops are reset all at once. Only driver units 2 to which the enable signal ENBL that is active at LOW level is inputted are specified. Only the specified driver units are all at once operated according to the single strobe signal DST which is active at HIGH level and which is inputted from the external to drive the corresponding blocks of the heating array 1.

[0011] Each of the driver units 2 comprises the shift register 22 and the latch register 21 for storing the print data HDAT designating dots to be energized this time of the corresponding heating array 1 and the history data designating dots which was not energized last time and which is to be energized this time. According to this, the logic circuit 3 comprises a transfer control means 32. In the present embodiment, the transfer control means 32 comprises sets of an OR gate of negative logic 321 and an AND gate of negative logic 322 serially connected therewith. The transfer control means 32 further comprises another AND gate of negative logic 323. All of these OR gates 321 and AND gates 322 and 323 are each provided with two inverting input terminals and one inverting output terminal. As is clear from the figure, when a control signal CTRL inputted from the external is at LOW level, the transfer control means 32 supplies the latch signal LATCH also inputted from the external as it is to the input terminal LSTX of each of the driver units 2 through the AND gate 323 and OR gate 321. According to this, the history data stored in advance in the shift registers 22 of all the driver units 2 is transferred collectively as it is to the latch registers 21. Next, the print data HDAT is stored in the shift registers 22 of all the driver units 2. Then, when the control signal CTRL is switched to HIGH level, the transfer control means 32 supplies the latch signal LATCH inputted again from the external only to the specified driver units 2 via the corresponding OR gate 321 and AND gate 322. According to this, only the specified driver units 2 conducts selective transfer of the print data from the shift registers 22 to the latch registers 21. As a result, the specified driver units 2 first preliminarily energize dots of the corresponding heating array 1 based on the history data latched at the latch registers 21, and then regularly energize dots of the corresponding heating array 1 based on the print data HDAT selectively transferred to the latch registers 21.

The logic circuit 3 further comprises a data operation means 33 for logically processing the print data HDAT for the last time remaining in the shift registers 22 of the driver units 2 and the print data HDAT for this time to be inputted from the external to internally originate the history data. The internally originated history data is, as described in the above, supplied to the input terminal SI of the driver unit 2 at the head to be transferred sequentially to the driver units 2 at the subsequent and the following stages. It is to be noted that the print data HDAT for the last time is supplied from the output terminal SO of the driver unit 2 at the last stage to the data operation means 33. In the present embodiment, the data operation means 33 comprises an AND gate 331 and a NAND gate 332 serially connected therewith. The AND gate 331 is provided with two input terminals and one output terminal. The NAND gate 332 is provided with two input terminals and one inverting output terminal. As is understood from the figure, when the control signal CTRL is at HIGH level, the NAND gate 332 of the preceding stage inverts the print data for the last time transferred from the driver unit 2 at the last stage. The AND gate 331 at the subsequent stage conducts AND operation between the serially inputted print data HDAT for this time and the inverted print data for the last time to originate the desired history data. As is clear from this logic operation, the history data designates dots which was not energized last time and which is to be energized this time. On the other hand, after the control signal CTRL is switched to LOW level, the AND gate 331 at the subsequent stage supplies the print data HDAT for this time serially inputted again as it is to the input terminal SI of the driver unit 2 at the head.

As described in the above, according to the present invention, the logic circuit 3 comprising, for example, a gate array is mounted on the thermal head and the latch signal and the enable signal are supplied to each of the driver units. By inputting the latch signal and the enable signal for each of the driver units as serial signals synchronous with the clock, the number of the input signal lines is reduced. Further, AND operation is conducted between the print data inputted as serial signals and the data inverted from the print data of the previous dot line outputted from the shift registers in the driver units to originate the history data. The history data is supplied to the data input terminal of the driver unit at the head. Further, selection bits corresponding the respective driver units are latched, and only driver units specified by the selection bits are operated according to the strobe signal. Further, the latch signal is supplied only to the driver units specified by the selection bits, and the data stored in the shift registers in the specified driver units is transferred to the respective latch registers. The driver selection bits as the block selection data BDAT are inputted by the clock signal BCLK in the form of the clock synchronization serial signals. In addition, a mode in which the latch signal LATCH is selectively supplied to the driver units specified by the driver selection bits and a mode in which the latch signal LATCH is supplied to all the driver units all at once independently of the specifying by the driver selection bits to latch collectively all the driver units can be switched to each other. This mode switching is conducted according to the control signal CTRL inputted from the external. In addition, transfer of the history data and transfer of the print data to the driver units can be switched to each other by the control signal CTRL. It is to be noted that, though, in the present embodiment, the input signal lines for the strobe signal DST, the clock signal HCLK, and the print data HDAT and the signal lines for the block selection data BDAT, the clock signal BCLK, and the clear signal BCLR are separately provided, instead, both of the two groups can be supplied through common signal lines and the place where the signals are inputted can be internally switched with an additional control signal. In this way, the number of the signal lines can be further reduced. Further, it may be that the print data inputted to the thermal head is all 0 or all 1, the print data of the all 0 or all 1 is transferred to the thermal head, and the number of the clocks is counted until all the data inputted from the serial output terminals SO of the thermal head is outputted. In this way, the number of all the dots of the thermal head can be detected to discriminate the type of a printer connected with the printer control circuit.

Figure 2:
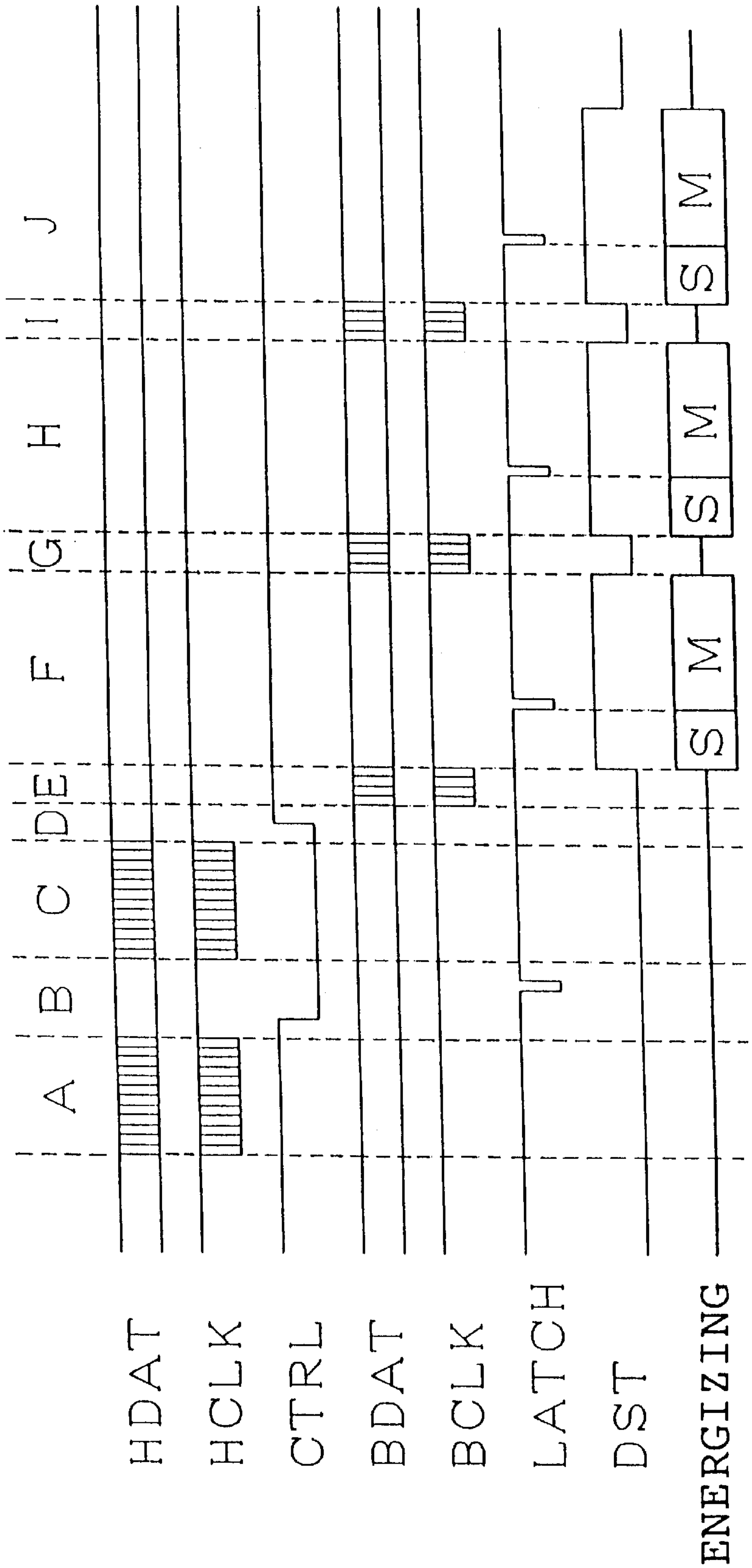
FIG. 2 is a timing chart of the thermal printer according to the present invention.

Next, the operation of the printer shown in FIG. 1 is described in detail with reference to a timing chart shown as FIG. 2. First, at a timing A, CTRL is made to be at HIGH level and the print data HDAT for this time is inputted. The print data HDAT is logically processed by the data operation means 33 to internally originate the history data. The history data is stored in the shift registers 22 of all the driver units 2 in synchronous with HCLK. Next, at a timing B, CTRL is switched to LOW level and LATCH is made to be active at LOW level. By this, the history data stored in the shift registers 22 of all the driver units 2 is transferred all at once to the latch registers 21. At a timing C, while CTRL is maintained to be at LOW level, the print data HDAT for this time is again inputted. The print data HDAT passes through the data operation means 33 as it is without being processed to be written in the shift registers 22 of the respective driver units 2. After that, at a timing D, the control signal CTRL returns from LOW level to HIGH level. Next, at a timing E, the block selection data BDAT is inputted to the block specifying means 31 of the logic circuit 3 while being synchronized with the clock signal BCLK. By this, the driver units 2 of the blocks to be operated for the first time are specified. Next, at a timing F, the strobe signal DST is made to be active at HIGH level and the specified driver units 2 are operated. Here, first, during the first half of the timing F, based on the history data latched in the latch registers 21 of the specified driver units 2, the corresponding dots are preliminary energized. Next, after the preliminary energizing based on the history data ends, during the second half of the timing F, the latch signal LATCH is made to be active at LOW level. By this, the print data stored in the shift registers 22 of the specified driver units 2 is selectively transferred to the latch registers 21. Based on the transferred print data, the corresponding dots are regularly energized. At a time when the first printing operation ends, the strobe signal DST returns to LOW level. As a result, printing operation is conducted only with regard to the specified blocks. In the printed content, the portions shown as S denote preliminarily energized dots while the portions shown as M denote regularly energized dots. After that, at a timing G, dynamic division drive for the second time begins. In other words, the block selection data BDAT is written in the block specifying means 31 in synchronous with the clock signal BCLK. Next, during the first half of a timing H, preliminary energizing is conducted, and, during the second half of the timing H, regular energizing is conducted. By this, history control drive using the history data and the print data is carried out. Finally, at a timing I, dynamic division drive for the third time begins. In other words, BDAT is written in the block specifying means 31 in synchronous with BCLK. Next, at a timing J, history control drive is carried out. As described in the above, in the present embodiment, dynamic division drive is carried out three times to print one line. History control drive is carried out every time dynamic division drive is carried out. It is to be noted that the print data for the next line can be inputted after a LOW pulse in LATCH at a timing J. The print data HDAT inputted this time is used in originating the history data for the next time.

Next, an example of dynamic division drive and history control drive is described in detail with reference to the following Table 1.

TABLE 1

| | | | | | | | |
|---|---|---|---|---|---|---|---|
| 1 | shift register | [a] | [b] | [c] | [d] | [e] | [f] |
| | latch register | [x] | [x] | [x] | [x] | [x] | [x] |
| 2 and 3 | shift register | [A] | [B] | [C] | [D] | [E] | [F] |
| | latch register | [a] | [b] | [c] | [d] | [e] | [f] |
| 5 and 6 | shift register | [A] | [B] | [C] | [D] | [E] | [F] |
| | latch register | [a] | [b] | [c] | [d] | [e] | [f] |
| | energizing | * | | * | | | * |
| 6 | shift register | [A] | [B] | [C] | [D] | [E] | [F] |
| | latch register | [A] | [b] | [C] | [d] | [e] | [F] |
| | energizing | * | | * | | | * |
| 7 and 8 | shift register | [A] | [B] | [C] | [D] | [E] | [F] |
| | latch register | [A] | [b] | [C] | [d] | [e] | [F] |
| | energizing | | * | | * | | |
| 8 | shift register | [A] | [B] | [C] | [D] | [E] | [F] |
| | latch register | [A] | [B] | [C] | [D] | [e] | [F] |
| | energizing | | * | | * | | |
| 9 and 10 | shift register | [A] | [B] | [C] | [D] | [E] | [F] |
| | latch register | [A] | [B] | [C] | [D] | [e] | [F] |
| | energizing | | | | | * | |
| 10 | shift register | [A] | [B] | [C] | [D] | [E] | [F] |
| | latch register | [A] | [B] | [C] | [D] | [E] | [F] |
| | energizing | | | | | * | |

As shown in the above Table 1, First, at the timing 1, the history data a, b, c, d, e, and f for one line are written in the shift registers of all the driver units. In the present example, for the sake of simplification, suppose the heating array for one line is split up into six blocks. The history data a, b, c, d, e, and f denote data allotted to the respective blocks, and this is the same throughout the following description. At the timing 1, the latch registers are blank, which is shown by the latter x. Next, at the timing 2, the history data a to f are transferred to the latch registers all at once. Further, at the timing 3, the print data A, B, C, D, E, and F for one line are transferred again from the external to all the shift registers. Next, at the timing 5, the blocks to be operated in the first dynamic division drive are specified. In the present example, the first, the third and the sixth blocks are specified, which are marked with symbols “*”. Further, during the first half of the timing 6, dots in the blocks specified based on the history data a, c, and f stored in the latch registers are preliminary energized. Next, during the second half of the timing 6, the print data A, C, and F are transferred to the shift registers to the latch registers only with respect to the specified blocks. Dots in the blocks specified based on the latched print data A, C, and F are regularly energized. By the above procedure, the first dynamic division drive is carried out. Here, history control drive using the history data and the print data is conducted. Next, the second dynamic division drive follows. First, at the timing 7, the next group of blocks is specified. In the present example, the second and the fourth blocks are specified. During the first half of the timing

8, preliminary energizing is conducted based on the history data b and d stored in the latch registers. Further, during the second half of the timing 8, as for the content of the latch registers, the history data b and d are replaced by the print data B and D. Regular energizing is conducted with respect to blocks specified based on the print data B and D. Finally, the third dynamic division drive follows. At the timing 9, the remaining fifth block is specified. Further, during the first half of the timing 10, preliminary energizing is conducted with respect to the block specified based on the history data 10 remaining in the latch register. During the second half of the timing 10, the history data e in the latch register is replaced by the print data E. Regular energizing of the final remaining block is conducted based on the print data E. As described in the above, according to the present invention, the history data and the print data are required to be supplied only at the early timings 1, 2, and 3, independently of the number of the dynamic division drive (the number of the energizing cycles). Further, since the history data is originated internally by the logic circuit 3, no calculation is necessary on the side of the external printer control circuit. The side of the printer control circuit only has to switch the control signal CTRL between HIGH level and LOW level and transfer the print data two times. When CTRL is at HIGH level, the history data is stored in the shift registers. When CTRL is at LOW level, the print data is written in the shift registers. Meanwhile, the history data written in advance is transferred to the latch registers.

Figure 4:
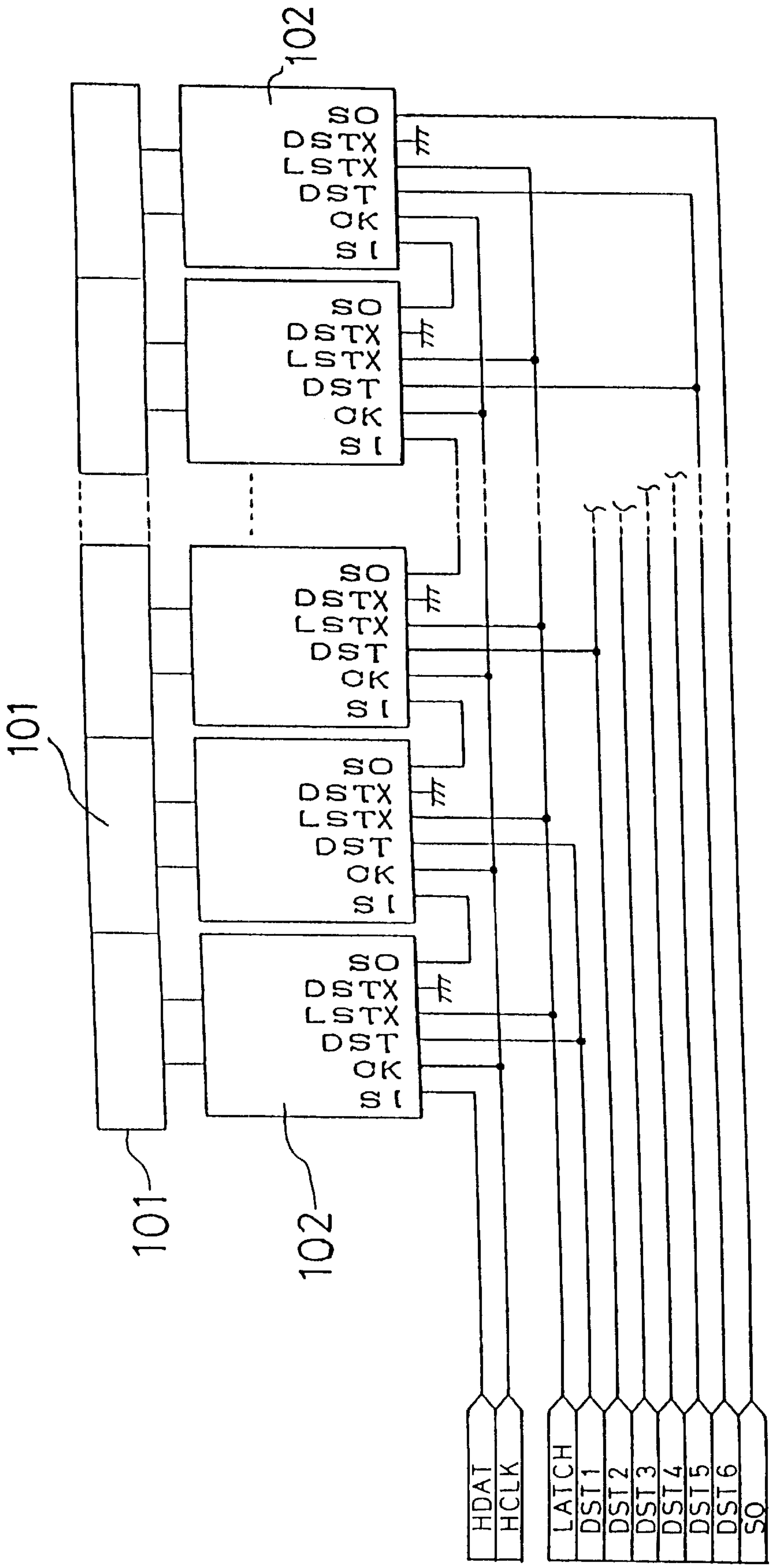
FIG. 4 PRIOR ART
FIG. 4 is a block diagram showing an example of electrical structure of a conventional thermal printer.

Next, for reference, history control drive conducted with the conventional printer shown in FIG. 4 is described in brief with reference to TABLE 2. According to the conventional printer shown in FIG. 4, since data transfer in all the driver units 102 is controlled via one latch signal line, history control drive in practice is quite complicated.

TABLE 2

| | | | | | | | |
|---|---|---|---|---|---|---|---|
| 1 | shift register | [a] | [b] | [c] | [d] | [e] | [f] |
| | latch register | [x] | [x] | [x] | [x] | [x] | [x] |
| 2 | shift register | [A] | [B] | [C] | [D] | [E] | [F] |
| | latch register | [a] | [b] | [c] | [d] | [e] | [f] |
| | energizing | * | | * | | | * |
| 3 | shift register | [A] | [B] | [C] | [D] | [E] | [F] |
| | latch register | [A] | [B] | [C] | [D] | [E] | [F] |
| | energizing | * | | * | | | * |
| 4 | shift register | [a] | [b] | [c] | [d] | [e] | [f] |
| | latch register | [A] | [B] | [C] | [D] | [E] | [F] |
| 5 | shift register | [A] | [B] | [C] | [D] | [E] | [F] |
| | latch register | [a] | [b] | [c] | [d] | [e] | [f] |
| | energizing | | * | | * | | |
| 6 | shift register | [A] | [B] | [C] | [D] | [E] | [F] |
| | latch register | [A] | [B] | [C] | [D] | [E] | [F] |
| | energizing | | * | | * | | |
| 7 | shift register | [a] | [b] | [c] | [d] | [e] | [f] |
| | latch register | [A] | [B] | [C] | [D] | [E] | [F] |
| 8 | shift register | [A] | [B] | [C] | [D] | [E] | [F] |
| | latch register | [a] | [b] | [c] | [d] | [e] | [f] |
| | energizing | | | | | * | |
| 9 | shift register | [A] | [B] | [C] | [D] | [E] | [F] |
| | latch register | [A] | [B] | [C] | [D] | [E] | [F] |
| | energizing | | | | | * | |

As shown in TABLE 2 above, first, at the timing 1, the history data a, b, c, d, e, and f for one line are inputted from the external to the shift registers of the six blocks. Here, the latch registers are blank. Next, at the timing 2, after the history data a to f are transferred to the latch registers, the print data A, B, C, D, E, and F for this time are transferred to the shift registers of all the blocks. Then, with respect to the specified blocks, preliminary energizing is conducted based on the history data a, c, and f stored in the latch registers. At the timing 3, the print data A to F for this time are written from the shift registers to the latch registers. Regular energizing is conducted with respect to the blocks specified based on the print data A, C, and F written in the latch registers. By the above procedure, the first dynamic division drive ends, and history control drive is carried out with respect to the specified first, third, and sixth blocks. Next, at the timing 4, the history data a to f for all the line are again transmitted and inputted from the external to the shift registers. Next, at the timing 5, the history data a to f are written from the shift registers to the latch registers. Further, the print data A to F for all the line are again transferred and inputted from the external to the shift registers. Then, preliminary energizing is conducted with respect to the second and the fourth blocks specified based on the history data b and d written in the latch registers. Next, at the timing 6, the print data A to F are written from the shift registers to the latch registers. Regular energizing is conducted with respect to the blocks specified based on the written print data B and D. By the above procedure, the second dynamic division drive ends, and history control drive is carried out with respect to the specified second and fourth blocks. In the same way, at timings 7, 8, and 9, with respect to the remaining fifth block, the history data a to f and the print data A to F are sequentially transferred again to carry out the third dynamic division drive. In this way, according to the conventional printer, since the regular energizing based on the print data is conducted just after the preliminary energizing based on the history data, it is required that the print data is in the shift registers while the history data is in the latch registers. Since this is repeated in every cycle of each dynamic division drive, in order to finish the printing operation for one line, the history data and the print data have to be transferred and inputted repeatedly from the external, and thus, it takes much time just to transfer the data.

Figure 3:
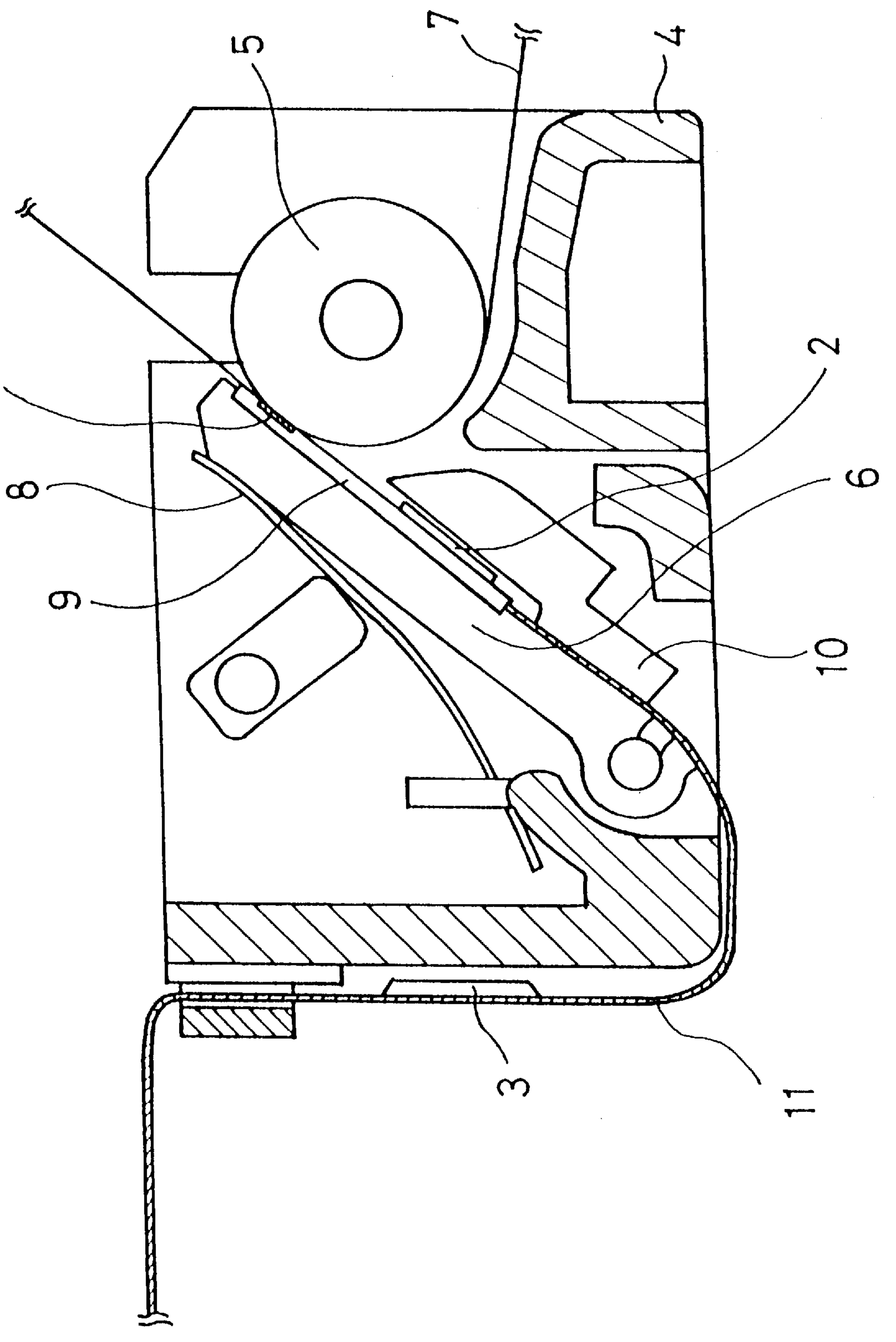
FIG. 3 is a schematic sectional view showing a mechanical structure of the thermal printer according to the present invention.

Finally, mechanical structure of the thermal printer according to the present invention is described in detail with reference to FIG. 3. As shown in the figure, a platen 5 and a thermal head 6 are incorporated in a frame 4. Thermosensitive paper 7 to be printed is sandwiched between the platen 5 and the thermal head 6. The thermal head 6 is urged toward the platen 5 by a spring 8. A circuit board 9 is incorporated in the thermal head 6. The heating array 1 and the driver units 2 described in the above are mounted on the circuit board 9. The driver units 2 comprise one-chip ICs. The driver units 2 are covered with a cover 10. A flexible board 11 leading to the external is connected with the circuit board 9. The logic circuit 3 described in the above is mounted on the flexible board 11. The logic circuit 3 comprises a gate array as a one-chip IC. As described in the above, the logic circuit 3 comprises a transfer control means for conducting efficient transfer control of the history data and the print data and a data operation means for originating the history data internally. Therefore, compared with the conventional thermal printer, history control drive can be carried out more efficiently, and a small size printer which is easy to use is obtained. Further, the logic circuit 3 comprises a block specifying means for specifying blocks to be operated based on the block selection data, which makes it possible to conduct dynamic division drive with a single strobe signal. Therefore, compared with the conventional thermal printer, the number of output ports on the control side such as the printer control circuit is reduced. Further, on the side of the printer, the number of terminals (the number of poles) of the connector and the flexible board can be reduced. In addition, independently of the type, a connector of the same pin arrangement can be used. On the other hand, according to the conventional printer, if dynamic division drive is required to be precise, strobe signal input lines the number of which is the same as that of the blocks, resulting in increase of the cost of the flexible board and the connector. Further, additional output ports on the control side such as the printer control circuit are required, and providing more ports is inevitable. Further, according to the conventional thermal printer, a single latch signal line controls data transfer in all the driver units. In this case, when history control drive is conducted in combination with dynamic division drive, data transfer has to be done repeatedly, and it takes much time to conduct history control drive. If, in order to avoid this, history control drive is required to be efficiently carried out, latch signal lines the number of which is the same as that of the strobe signal lines are necessary, resulting in extreme increase in the total number of the signal lines. In addition, according to the conventional printer, the history data is required to be operated on the side of the printer control circuit, which results in prolonged time necessary for data processing and lowering of the printing speed accordingly.

As described in the above, according to the present invention, a small size printer has not only a heating array and a driver unit but also a built-in logic circuit comprising a gate array and so on. The logic circuit comprises block specifying means, and, according to a single strobe signal, specified heating arrays are operated all at once, and what is called dynamic division drive is carried out. Since dynamic division drive can be conducted with a single strobe signal line, the number of port outputs on the control side such as a printer control circuit can be extremely reduced compared to the conventional one. Further, on the side of the small size printer, the number of terminals of the connector and the flexible board leading to the external can be reduced. In addition, independently of the type of the thermal head, a connector of the same pin arrangement can be used. Further, according to the present invention, the logic circuit comprises a transfer control means for conducting transfer control of history data and print data. By this, data transfer from the side of the printer control circuit to the side of the thermal printer is conducted efficiently, and what is called history control drive is improved, and thus, a small size printer which is easy to use is obtained. Further, the logic circuit comprises a data operation means, and the history data can be internally originated based on the print data for the last time and the print data for this time. Accordingly, since the history data is not required to be operated on the side of the printer control circuit, the time necessary for data processing can be shortened and the printing speed can be made higher accordingly.

What is claimed is:

1. A thermal printer comprising a plurality of heating arrays for printing, the heating arrays having a plurality of dot printing elements and being split up into a plurality of blocks and arranged in a line, a plurality of driver units each for driving a respective block of the heating arrays separately from the other blocks, and a logic circuit for controlling the driver units, wherein:

the logic circuit comprises block specifying means for specifying one or more of the driver units to be operated according to externally supplied block selection data, the specified driver units being operated simultaneously in response to a single externally supplied strobe signal to drive the corresponding one or more specified blocks of the heating arrays and wherein each of the driver units comprises a shift register and a latch register for storing print data designating dot printing elements of the heating arrays to be energized during a current print operation and historic data designating dot printing elements which are to be energized during the current print operation and which were not energized during an immediately preceding print operation.

2. The thermal printer according to claim 1; wherein the logic circuit further comprises transfer control means for controlling a print operation by initially storing the historic data in the shift registers of the respective driver units, collectively transferring the historic data to the respective latch registers, storing the print data in the shift registers of the respective driver units after the historic data has been transferred to the respective latch registers, and transferring the print data from the respective shift registers to the respective latch registers in the one or more specified driving units so that the one or more specified driver units preliminarily energizes dot printing elements of the corresponding heating arrays based on the historic data latched at the latch registers and then regularly energizes dot printing elements of the corresponding heating arrays based on the print data selectively transferred to the latch registers.

3. The thermal printer according to claim 2; wherein the logic circuit comprises data operation means for logically processing print data for the immediately preceding print operation and remaining in the shift registers of the driver units and the print data for the current print operation input from an external source to internally determine the historic data.

4. A thermal printer comprising: a heating array having a plurality of dot printing elements capable of being selectively energized being arranged therein; a driver unit for driving the heating array based on print data designating dot printing elements to be energized; and a logic circuit for logically processing print data received from an external source for a current print operation and print data for an immediately preceding print operation to internally determine historic data designating dot printing elements which were not energized during the immediately preceding print operation and which are to be energized during the current print operation so that the driver unit preliminarily energizes dot printing elements specified based on the historic data and regularly energizes dot printing elements specified based on the print data for the current print operation.

5. The thermal printer according to claim 4; wherein the heating array comprises a plurality of blocks, the driver circuit comprises a plurality of driver units corresponding to the respective blocks, and the logic circuit comprises block specifying means for specifying one or more driver units to be operated according to externally supplied block selection data, and only the specified driver units are simultaneously operated in response to a single strobe signal from an external device to drive the one or more corresponding blocks of the heating array.

6. The thermal printer according to claim 5; wherein each of the driver units comprises a latch register and a shift register for sequentially storing the historic data and the print data for the current print operation, the logic circuit comprises transfer control means for initially storing the historic data in the shift registers of all of the driver units, transferring collectively the historic data to the latch registers, storing the print data in the shift registers of all of the driver units, and transferring selectively the print data from the shift registers to the latch registers of the one or more specified driver units such that the one or more specified driver units first preliminarily energizes dot printing elements based on the historic data latched at the latch registers and then regularly energizes dot printing elements based on the print data selectively transferred to the latch registers.

7. The thermal printer according to claim 1; wherein the block specifying means and the transfer control means for specifying the driver unit or driver units are receptive of serial data.

8. A printer comprising: a print head having a plurality of printing elements and being split up into a plurality of separately activatable blocks each block having plural printing elements; a plurality of driver units each for driving a respective block of the print head separately from the other blocks; and block specifying means for specifying one or more of the driver units to be operated according to externally supplied block selection data, the specified driver units being operated simultaneously in response to a single externally supplied strobe signal to drive the corresponding one or more specified blocks of the print head; wherein each of the driver units comprises a shift register and a latch register for storing print data designating printing elements of the corresponding block of the print head to be energized during a current print operation and historic data designating printing elements of the corresponding block of the print head which are to be energized during the current print operation and which were not energized during an immediately preceding print operation.

9. A printer according to claim 8, further comprising transfer control means for controlling a print operation by initially storing the historic data in the shift registers of the respective driver units, collectively transferring the historic data to the respective latch registers, storing the print data in the shift registers of the respective driver units after the historic data has been transferred to the respective latch registers, and transferring the print data from the respective shift registers to the respective latch registers in the one or more specified driving units so that the one or more specified driver units preliminarily energizes printing elements of the corresponding blocks based on the historic data latched at the latch registers and then regularly energizes printing elements of the corresponding blocks based on the print data selectively transferred to the latch registers.

10. A printer according to claim 9; further comprising data operation means for logically processing print data for the immediately preceding print operation and remaining in the shift registers of the driver units and the print data for the current print operation input from an external source to internally determine the historic data.

11. A printer according to claim 8; wherein the printer is a thermal printer, each block of the print head comprises a heating array, the plural heating arrays being arranged in a line, and the printing elements each comprise a dot printing element for printing a dot.

12. A printer according to claim 11; further comprising a frame for housing the print head; a platen mounted within the frame; means for sandwiching a recording paper between the platen and the print head; means for urging the thermal head toward the platen; and a circuit board containing the driver units mounted to the print head.

13. A printer comprising: a print head having a plurality of printing elements capable of being selectively and separately energized; a driver unit for driving the print head based on print data designating printing elements to be energized; and a logic circuit for logically processing print data received from an external source for a current print operation and print data for an immediately preceding print operation to internally determine historic data designating printing elements which were not energized during the immediately preceding print operation and which are to be energized during the current print operation so that the driver unit preliminarily energizes dot printing elements specified based on the historic data and regularly energizes dot printing elements specified based on the print data for the current print operation.

14. A printer according to claim 13; wherein the print head comprises a plurality of blocks each having a plurality of printing elements, the driver unit comprises a plurality of driver units each corresponding to a respective block, and the logic circuit comprises block specifying means for specifying one or more driver units to be operated according to externally supplied block selection data such that only the specified driver units are simultaneously operated in response to a single strobe signal from an external device to drive the one or more corresponding blocks of the print head.

15. A printer according to claim 14; wherein each of the driver units comprises a latch register and a shift register for sequentially storing the historic data and the print data for the current print operation, the logic circuit comprises transfer control means for initially storing the historic data in the shift registers of all of the driver units, collectively transferring the historic data to the latch registers, storing the print data in the shift registers of all of the driver units, and selectively transferring the print data from the shift registers to the latch registers of the one or more specified driver units such that the one or more specified driver units first preliminarily energizes dot printing elements based on the historic data latched at the latch registers and then regularly energizes printing elements based on the print data selectively transferred to the latch registers.

16. A printer according to claim 13; wherein the block specifying means and the transfer control means for specifying the driver unit or driver units are receptive of serial data.

17. A printer according to claim 13; wherein the printer is a thermal printer, each block of the print head comprises a heating array, the plural heating arrays being arranged in a line, and the printing elements each comprise a dot printing element for printing a dot.

* * * * *